United States Patent [19]

Swenson et al.

[11] Patent Number: 5,018,777
[45] Date of Patent: May 28, 1991

[54] HINGE AND CONNECTION ASSEMBLY FOR REMOVABLE TRUCK TOPPER

[76] Inventors: Gleo S. Swenson, P.O. Box 22, Glenwood, Minn. 56334; Robert D. Grove, 317 Seventh Ave. SE.; Clinton E. Grove, R.R. 2, both of ELbow Lake, Minn. 56531

[21] Appl. No.: 500,089

[22] Filed: Mar. 27, 1990

[51] Int. Cl.$^5$ ............................................. B60J 7/10
[52] U.S. Cl. ...................................... 296/100; 16/231
[58] Field of Search ...................... 296/100, 216, 156; 16/231, 233

[56] References Cited

U.S. PATENT DOCUMENTS

| | | | |
|---|---|---|---|
| 2,886,375 | 5/1959 | Crawford | 296/100 |
| 3,180,674 | 4/1965 | Pounds | 296/100 |
| 4,142,760 | 3/1979 | Dockery et al. | 296/100 |
| 4,181,351 | 1/1980 | Spanke | 296/100 |
| 4,522,440 | 6/1985 | Gostomski | 296/100 |
| 4,629,243 | 12/1986 | Jensen | 296/100 |
| 4,819,981 | 4/1989 | Moe et al. | 296/100 |

Primary Examiner—Robert R. Song
Attorney, Agent, or Firm—Dorsey & Whitney

[57] ABSTRACT

A hinge and connection assembly kit is used in combination with an open vehicle box covered by a cap or topper and having a pair of opposed parallel sidewalls, each with a channel rail along the interior of the upper edge of the sidewall. The vehicle cap for covering the open vehicle box also has a pair of opposed parallel sidewalls, each of which has a base rail along its lower margin for resting on the channel rails of the vehicle box. The kit comprises a plurality of hinge connection assemblies connected between the channel rails of the box sidewalls and the adjacent base rails of the cap sidewalls. Each hinge/connection assembly grasps the channel rail of a box sidewall. A lower hinge plate is connected to the channel grasping structure and has a first, downwardly concave hinge channel at its outer edge. A corresponding upper hinge plate is connected to a cap base rail above the lower hinge plate. The upper hinge plate has a releasable capture latch for releasably capturing the first hinge channel to form a hinge axis within the first hinge channel, whereby the upper hinge plate and the cap base rail to which it is connected can rotate in an abbreviated arc about the hinge axis when the capture means is not released and the upper hinge plate can be vertically separated from the lower hinge plate when the capture means is released.

11 Claims, 5 Drawing Sheets

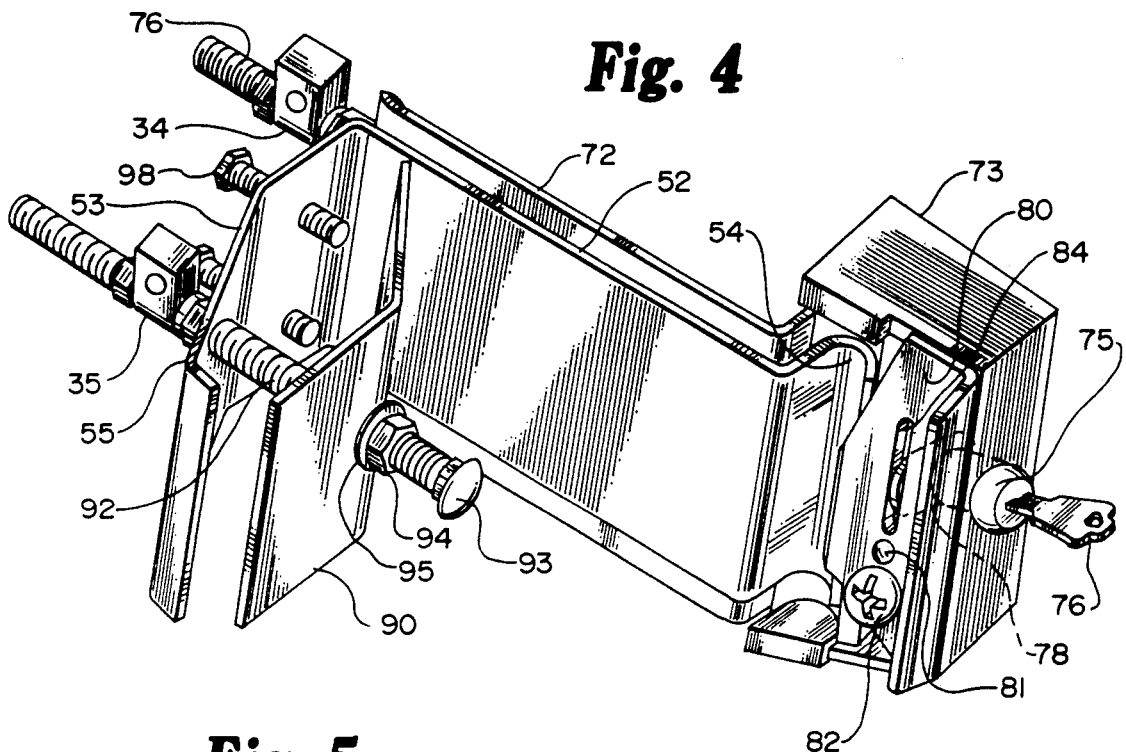
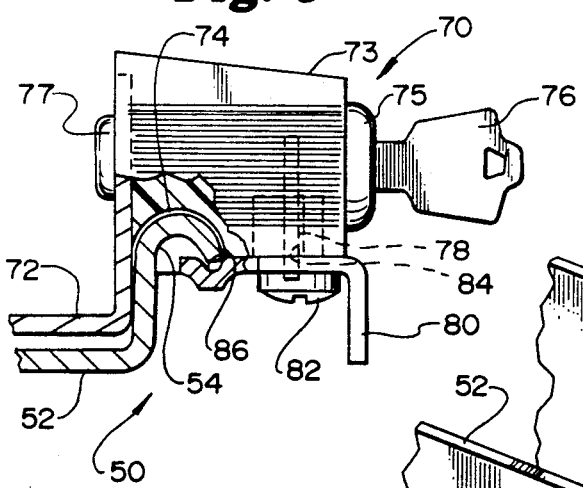
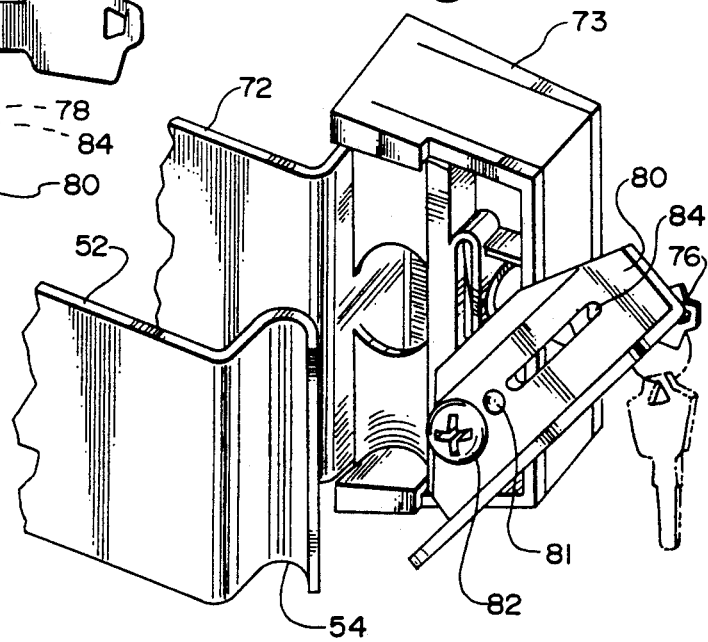

HINGE AND CONNECTION ASSEMBLY FOR REMOVABLE TRUCK TOPPER

BACKGROUND OF THE INVENTION

1. Field of the Invention

The present invention relates generally to a device for connecting a cap or topper to the box of a pickup or other truck so that it can be raised or removed. More particularly, the present invention relates to a hinge and connection assembly for removably mounting a truck cap or topper to the truck box such that either side of the cap or topper may be raised, with the other side serving as a stable hinge linked to the truck box.

2. Description of the Prior Art

Caps or toppers have become a popular way of enclosing the box of pickup trucks or other trucks having open beds with side and end walls. A variety of mechanisms have been developed to connect caps or toppers to the truck box. Some of these devices simply permit the cap or topper to be raised vertically above the box, e.g., U.S. Pat. Nos. 3,155,423 and 3,765,716. Other devices permit a truck box cover to be hinged at its forward edge, e.g., U.S. Pat. No. 4,124,247. Still others permit a truck box cap to be raised at one side of the truck box, while the other side of the cap rotates in hinged fashion along the other side of the truck box, e.g., U.S. Pat. Nos. 2,886,375; 3,180,674; 3,508,787; 4,181,351; 4,629,243; and 4,819,981.

Among the disadvantages of the prior art devices are that they are relatively complicated mechanical assemblies and therefore relatively expensive to manufacture. In addition, a number of the prior mechanisms have not provided adequate security, in the form of a mechanism or a structure that is easily locked to prevent the cap from being raised by unauthorized persons. In some designs where locking is possible, a padlock must be supplied. Prior art structures have also, in general, required that the cap mounting brackets be attached with fasteners at holes bored through portions of the truck box (see, e.g., U.S. Pat. No. 4,819,981). Such holes compromise the integrity of the truck box, require extra tools and installation time and are exposed to view if the cap or topper is removed from the truck box. Accordingly, what is needed as an improvement over the prior art is a hinge and connection assembly that remedies the preceding deficiencies.

SUMMARY OF THE INVENTION

In the present invention, a hinge and connection bracket kit is used in combination with an open vehicle box covered by a cap or topper and having a pair of opposed parallel sidewalls, each with a channel rail along the interior of the upper edge of the sidewall. The vehicle cap for covering the open vehicle box also has a pair of opposed parallel side walls, each of which has a base rail along its lower margin for resting on the channel rails of the vehicle box. The kit comprises a plurality of hinge/connection assemblies connected between the channel rails of the box sidewalls and the adjacent base rails of the cap sidewalls. Each hinge/connection assembly has means for grasping the channel rail of a box sidewall. A lower hinge plate is connected to the means for grasping the box sidewall and has a first, downwardly concave hinge channel at its outer edge. A corresponding upper hinge plate is connected to a cap base rail above the lower hinge plate. The upper hinge plate has releasable capture means for releasably capturing the first hinge channel to form a hinge axis within the first hinge channel, whereby the upper hinge plate and the cap base rail to which it is connected can rotate in an abbreviated arc about the hinge axis when the capture means is not released and the upper hinge plate can be vertically separated from the lower hinge plate when the capture means is released.

It is an objective of the present invention to provide an improved hinge and connection assembly for a vehicle box cap or topper.

It is another objective of the invention to provide a hinge and connection assembly kit for a vehicle box cap that permits the cap to be opened and raised at either side while rotating around an axis at the opposite side.

It is a further objective of the invention to provide a hinge and connection assembly kit for attaching a vehicle box cap or topper that requires no holes to be drilled in the vehicle box.

It is an additional objective of the invention to provide a hinge and connection mechanism that can be easily locked with a self-contained lock to secure the cap or topper on the vehicle box.

These and other objectives of the invention will become clearer in the following detailed discussion of the preferred embodiment of the invention, including the following drawings.

BRIEF DESCRIPTION OF THE DRAWINGS

FIG. 4 is a perspective view from below the invention in its closed and locked position.

FIG. 5 is a fragmentary side elevational view with parts cut away of the lock/latch assembly of the present invention.

FIG. 7 is a fragmentary perspective view of the present invention with the rotatable latch swung out to show how release of the upper and lower hinge plates occurs.

DESCRIPTION OF THE PREFERRED EMBODIMENT

Figure 1:
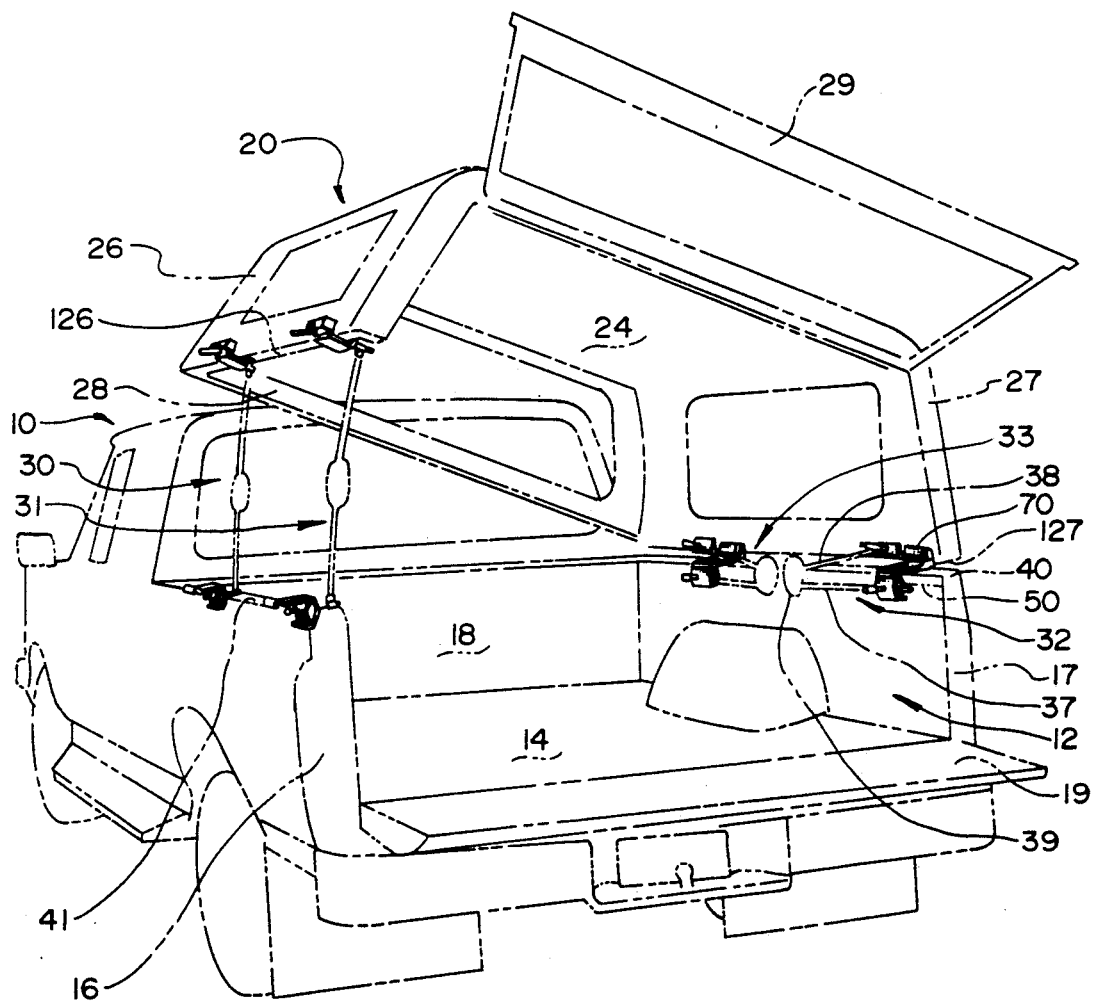
FIG. 1 is a perspective view of the invention in its environment.

As seen generally in FIG. 1, the invention involves a hinge and connection assembly that is used with a pickup truck 10 having a truck box 12 located behind its cab. The truck box 12 has a bed or floor 14. On the left and right sides of the truck bed 14 are generally vertical left and right box sidewalls, 16, 17, respectively. Each box sidewall 16, 17 has a channel rail 40, 41 along the interior of the upper edges of the sidewall. At the front of the box 12 is a front wall 18, while at the rear of the box 12 is a rear wall 19, which may be in the form of a tailgate that can be lowered. The topper or cap 20 used to cover the truck box 12 has a ceiling 24 and left and right sidewalls 26, 27, respectively, extending downward from the ceiling 24. Each cap side wall 26, 27 has a base rail 126, 127, along its lower margin for resting on the corresponding channel rail 40, 41. At the front of the topper or cap 20 is a cap front wall 28. A cap rear wall 29 is at the opposite end from the cap front wall 28 and may be mounted to swing open when the user desires access to the interior of the box 12 and cap 20.

As can be seen in FIG. 1, the invention is preferably used in the form of a kit comprising a plurality of hinge/connection assemblies 30, 31, 32, 33. As shown in FIG. 1, two such assemblies are on each side, giving the truck box 12 a front pair 30, 33 and a back pair 31, 31. Each hinge/connection assembly may be of the same construction, differing only in location and orientation. As best seen by reference to hinge/connection assembly 32 in FIG. 2, each such assembly consists generally of a lower hinge and mounting assembly 50 connected to the channel rail 40 of the right box sidewall 17 and an upper hinge and mounting assembly 70 attached to the base rail 127 of the cap 20. Referring also to FIG. 1, a lower lifting arm 37 extends from the lower hinge and mounting assembly 50 to a lift spring assembly 39, containing a coil spring and means for adjusting the degree of coiling. An upper lifting arm 38 extends from the spring assembly 39 and connects to the upper hinge and mounting assembly 70. The lifting arms 37, 38 and spring assembly 39 form a collapsible link structure between the upper and lower hinge and mounting assemblies 50, 70. (The mechanism of lifting arms 37, 38 and spring assembly 39 is disclosed in greater detail in U.S. Pat. No. 4,819,981, incorporated herein by reference.)

Turning again to FIG. 2, further structural details of the hinge/connection assembly 32 can be seen. The lower hinge and mounting assembly 50 comprises a lower hinge plate 52 that has associated with it means for grasping the channel rail 40. These grasping means include a flange 53 that extends substantially vertically downward from the plane of lower hinge plate 52. The lower portion 55 of the flange 53 has a slight horizontal bend near the center of the flange 53 and an almost right angle inward bend near its outer edge. (Both bends are longitudinal, i.e., in the direction of the axis of the truck box 12 or the normal direction of travel of the truck 10.) An anchor plate 90 that includes a slight horizontal and longitudinal bend near its center is attached to the flange 53 by means of a lower hinge mounting bolt 92. One end of the lower hinge mounting bolt 92 passes through the lower pivot block 35 at one end of the lower lifting arm 37 (shown in phantom lines). A pair of block connection nuts 96, one on each side of the lower pivot block 35 hold the lower pivot block 35 in place. An adjustment nut 94 with accompanying washer 95 is also threaded on the lower pivot mounting bolt 92 and is used to drive or compress the anchor plate 90 toward the flange 53. As can be seen, the forces exerted on anchor plate 90 by the adjustment nut 94 are resisted by an inner leg 42 of the channel rail 40, against which the adjustment bolt 98, threaded into the flange 53, bears. As can further be seen, the adjustment nut 94 also serves to determine how the head 93 of the lower hinge mounting bolt 92 bears against the interior of the right box sidewall 17. Jamming the bolt head 93 against the box sidewall 17 aids in stabilizing the mechanical connection of the means for grasping the channel leg 42. This grasping means (comprising flange 53, anchor plate 90 and bolt 92 with accompanying nuts) provides a firm connection of the lower hinge and mounting assembly 50 on the channel rail 40 without boring any holes through the channel rail 40. Thus, if the lower hinge and mounting assembly 50 is completely removed, then channel rail 40 and truck box 12 are unimpaired.

The upper and outer end of the lower hinge plate 52 is bent to form a first, downwardly concave hinge channel 54 having a half-cylindrical cross section. As can further be seen in FIG. 2, the first hinge channel 54 is surrounded by a second, downwardly concave hinge channel 74 that is contained within the lock assembly housing 73 of the upper hinge and mounting assembly 70. The lock assembly housing 73 also contains a key lock assembly 75 into which key 76 is inserted for rotary actuation of the locking cam 78. Attached to the lower surface of the lock assembly housing 73 is a rotatable latch 80, pivoting around latch pivot 82. Rotatable latch 80 has within it a locking slot 84 for insertion of the locking cam 78 when the rotatable latch 80 is to be locked in position.

The lock assembly housing 73 is attached by stud 77 to one end of the upper hinge plate 72, which is roughly channel-shaped in cross section. The width of the channel-shaped upper hinge plate 72 is sufficient to accommodate the base rail 127 of the cap 20, which is attached to the upper hinge plate 72 with bolts or other suitable fasteners 110. Affixed to the lower surface of the upper hinge plate 72 is a rubber seal 120 that extends longitudinally and across the width of the upper hinge plate 72. The upper pivot block 34 is used to connect the upper lifting arm 38 to the upper hinge plate 72, by means of block pin 76 and block connection nuts 78.

Referring now also to FIGS. 4 and 5, further details of the lock assembly housing 73 and associated parts can be seen. FIGS. 4 and 5 show how locking occurs using the key lock assembly 75. As can be seen, when the key 76 is turned to rotate the locking cam 78 into locking slot 84, rotatable latch 80 can no longer be rotated. When rotatable latch 80 is in its lock position, it will be seen that the outermost edge of the first hinge channel 54 mates with a locking groove 86 formed in rotatable latch 80, and the rotatable latch 80 and second hinge channel 74 form a releasable capture means for the first hinge channel 54. By contrast, FIGS. 6 and 7 shows how the rotatable latch 80 can be rotated to stand clear of the first hinge channel 54 when the locking cam 78 is removed from the locking slot 84.

Figure 3:
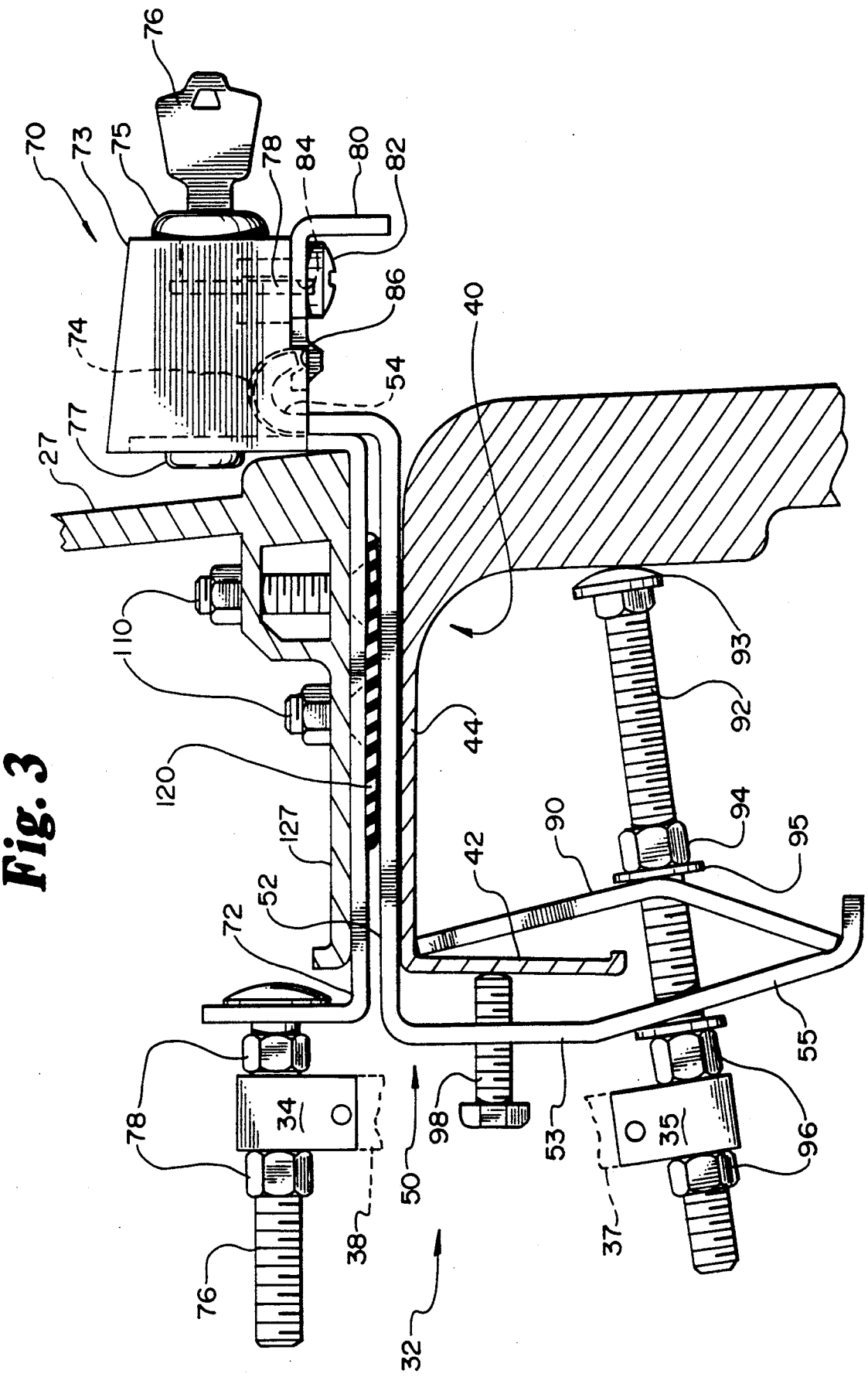
FIG. 3 is a side elevational view of the invention functioning in its closed and locked position.

FIG. 3 shows the hinge/connection assembly 32 in its locked position. As can be seen, in this position, the upper hinge plate 72 compresses the seal 120, which, in turn, rests on the lower hinge plate 52. Because the locking groove 86 captures the outermost edge of the first hinge channel 54, the upper hinge plate 72 cannot be raised. Accordingly, in this position, the cap 20 is locked down onto the channel rail 40 of the vehicle box 12.

Figure 2:
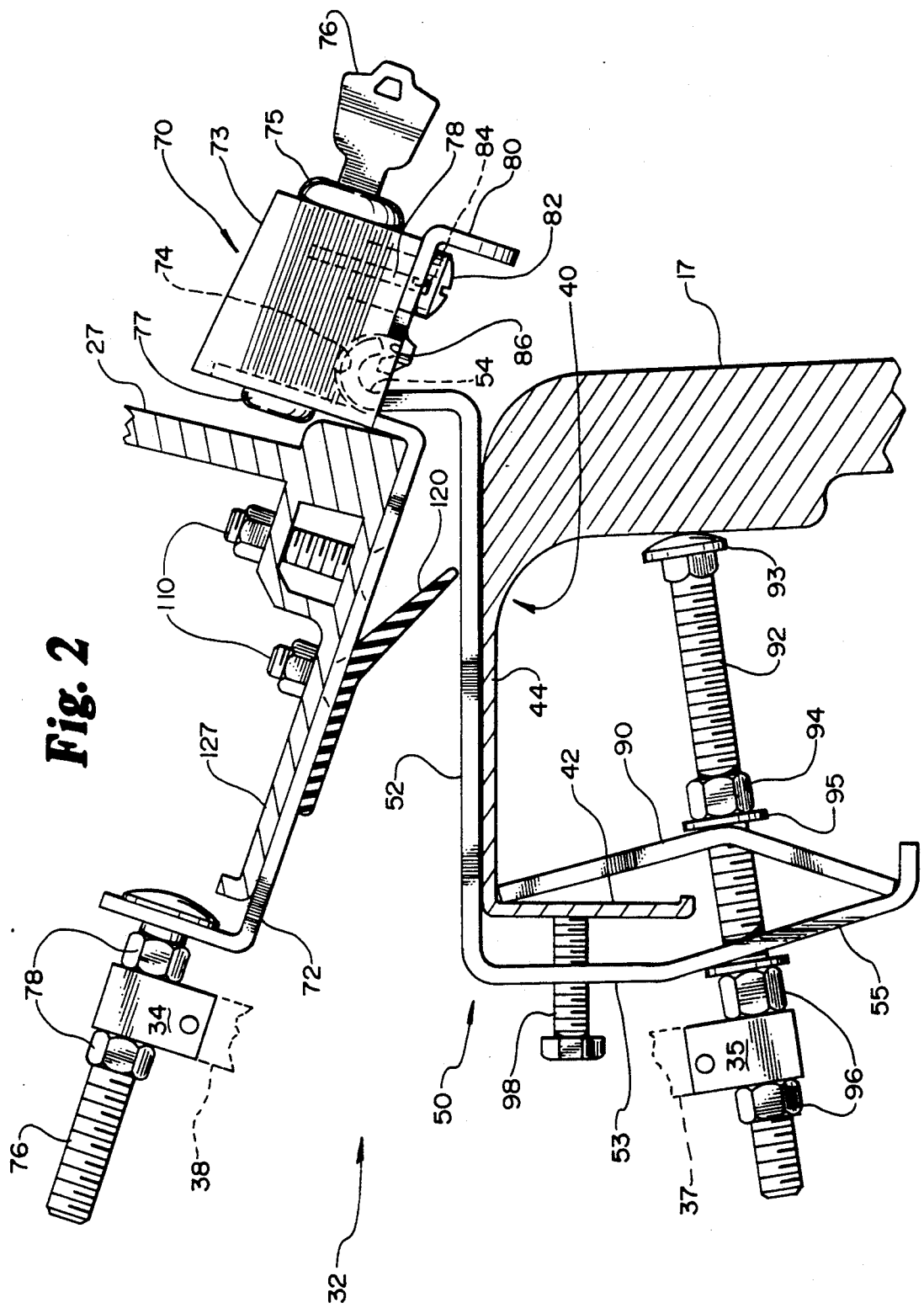
FIG. 2 is a side elevational view of the invention functioning as a hinge.

FIG. 2 shows how the hinge/connection assembly 32 functions as a hinge if the hinge/connection assemblies 30, 31 on the opposite side of the vehicle box 12 are raised to the position shown in FIG. 1 to open the cap 20 along its left side. As best seen in FIG. 2, the locking groove 86 of the rotatable latch 80 continues to capture the first hinge channel 54 so that the upper hinge plate 72 cannot be vertically separated from the lower hinge plate 52. Accordingly, the second hinge channel 74 rotates around the first hinge channel 54 and around an axis of rotation within the first hinge channel 54. This permits the left hand side of the cap 20 to be raised to whatever height is permitted by the length of the extended upper and lower lifting arms of hinge/connection assemblies 30, 31 and their corresponding spring assemblies.

Figure 6:
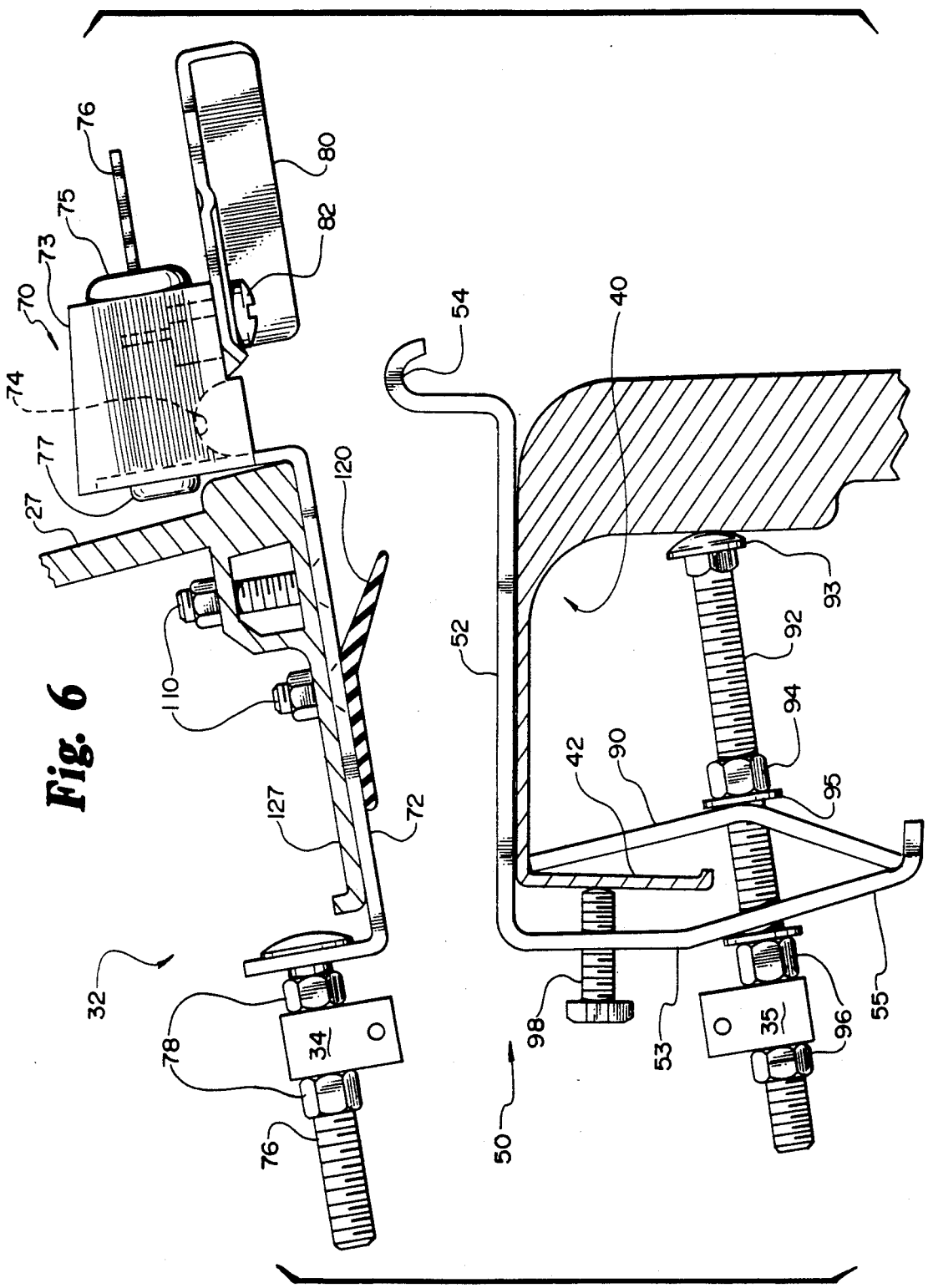
FIG. 6 is a side elevational view of the invention, unlocked and separated for raising the cap above the vehicle box.

FIG. 6 shows how the rotatable latch 80 is rotated around the latch pivot 82 to release the first hinge channel 54. When in the position shown in FIG. 6, the rotatable latch 80 permits the second hinge channel 74 to be lifted from its enclosure position around the first hinge channel 54. When this occurs, the upper hinge plate 72 can be vertically separated from the lower hinge plate 52 as shown in FIG. 6. Thus, it can be seen that a cap 20 as shown in FIG. 1 can be opened from either the right or the left side, depending on which hinge and bracket assemblies 30, 31, 32, 33 are unlocked. If the two hinge/connection assemblies 30, 31 on the left side are released and extended, the cap 20 can be raised as shown in FIG. 1. If the two hinge/connection assemblies 32, 33 on the right side are released and extended, then the right hand side of the cap 20 can be raised in the same way. If all of the hinge/connection units 30, 31, 32, 33 are released, the entire cap 20 can be raised vertically, but this is generally not recommended without special support for the cap 20, because the cap 20 can become unstable.

The upper and lower hinge plates 52, 72 are preferably made from steel, as is anchor plate 90. The lock assembly housing 73 is preferably made of a strong molded plastic, such as glass reinforced nylon or any other molded material, such as zinc or aluminum, because of its more intricate structure. The rotatable latch 80 connected to the housing 73 is preferably made of steel.

To facilitate positioning of the rotatable latch 80, it includes a detent dimple 81 (FIG. 7) designed to receive a spring biased ball or pin (not shown) contained within the housing 73. This detent mechanism helps position the rotatable latch 80 for locking with the locking cam 78 and prevents it from falling open when the locking cam 78 is not in position and the upper hinge plate 72 is tilted by rotation.

It will be seen by those skilled in the art that various changes may be made without departing from the spirit and scope of the invention. For example, it will be clear that the invention could be implemented with different forms of the flange 53 and anchor plate 90, so long as these elements serve to capture and grasp a portion of the box side wall 16, 17. In addition, it will be seen that a variety of different collapsible arm assemblies can be used, in place of the upper and lower lifting arms joined by spring assemblies as shown in FIG. 1. Further, although the invention has been described as having a locking, separable hinge/connection assembly near each of the four corners of the truck box 12, it will be understood that the lock mechanism 75 could be used at only one of the assemblies at each sidewall 16, 17 of the truck box 12, and that if a pair of normal butt hinges (as on a door) were installed on one sidewall 16 or 17 (using, preferably, the sample grasping means of flange 53, anchor plate 90 and bolt 92 with accompanying nuts), the invention could still be usefully employed to enable lifting of the cap 20 at the other sidewall only. Accordingly, the invention is not limited to what is shown in the drawings and described in the specification but only as indicated in the appended claims.

What is claimed as new and desired to be protected by Letters Patent is:

1. A hinge and connection assembly kit for use in combination with an open vehicle box, said box having a pair of opposed, parallel sidewalls, each with a channel rail along the interior of the upper edges of said sidewall, and a vehicle cap for covering the open vehicle box, said cap having a pair of opposed, parallel sidewalls, each with a cap base rail along its lower margin for resting on said channel rails, said bracket kit comprising:
   a plurality of hinge/connection assemblies connected between the channel rails of at least one box sidewall and the adjacent base rails of the corresponding cap sidewall, each hinge/connection assembly comprising:
   means for grasping the channel rail of a box sidewall;
   a lower hinge plate connected to said means for grasping and having a first, downwardly concave hinge channel at its outer edge;
   a corresponding upper hinge plate connected to a cap base rail above said lower hinge plate, said upper hinge plate having releasable capture means for releasably capturing said first hinge channel to form a hinge axis within the first hinge channel whereby the upper hinge plate and the cap base rail to which it is connected can rotate in an abbreviated arc about said hinge axis when said capture means is not released and the upper hinge plate can be vertically separated from the lower hinge plate when said capture means is released.

2. The hinge and connection bracket kit recited in claim 1 wherein the plurality of hinge/connection assemblies comprises four such assemblies, a rear pair with one on either side of and nearer the rear of the vehicle box and a forward pair, one on either side of and nearer the front of the vehicle box.

3. The hinge and connection assembly kit recited in claim 2 wherein a collapsible link structure extends between each lower hinge plate and the corresponding upper hinge plate.

4. The hinge and connection assembly kit recited in claim 3 wherein each pair of collapsible link structures on one side of the vehicle box is capable of supporting the cap in a position where the link structures on said one side are extended and the front and rear hinge/connection assemblies connected by said link structures on said one side are vertically separated while the front and rear hinge/connection assemblies on the other side remain unseparated and rotate about their respective hinge axes.

5. The hinge and connection assembly kit recited in claim 1, wherein the releasable capture means comprises a second, downwardly concave hinge channel surrounding the upper and outer portion of said first, downwardly concave hinge channel and a rotatable latch having a first position in which a portion of the latch closes a portion of the second, downwardly concave hinge channel to capture the first, downwardly concave hinge channel therein and a second position in which the second, downwardly concave hinge channel is open and the first downwardly concave hinge channel is not captured therein.

6. The hinge and connection assembly kit recited in claim 5 wherein the releasable capture means further comprises detent means for releasably holding the rotatable latch in said first position.

7. The hinge and connection assembly kit recited in claim 6, wherein the releasable capture means further in at least one hinge/connection assembly comprises a locking means for locking the rotatable latch in said first position.

8. The hinge and connection assembly kit recited in claim 7 wherein the locking means comprises a key actuated locking cam.

9. The hinge and connection assembly kit recited in claim 1 wherein the grasping means comprises a flange extending substantially vertically downward from said lower hinge plate to lie outside said channel rail, an anchor plate adjustably connected to lie substantially parallel to said flange inside said channel rail and means for adjusting the distance between and compressive force between said flange and said anchor plate to grasp a leg of said channel rail therebetween.

10. The hinge and connection assembly kit recited in claim 9 wherein the grasping means further comprises an adjustable sidewall support means for bracing the anchor plate at a specified distance away from the adjacent vehicle box sidewall.

11. The hinge and connection assembly kit recited in claim 1 further comprising resilient means for forming a seal between the upper and lower hinge plates.

* * * * *